(12) United States Patent
Merritt (10) Patent No.: US 10,937,035 B1
(45) Date of Patent: *Mar. 2, 2021

(54) SYSTEMS AND METHODS FOR A MULTI-TIERED FRAUD ALERT REVIEW

(71) Applicant: MASSACHUSETTS MUTUAL LIFE INSURANCE COMPANY, Springfield, MA (US)

(72) Inventor: Sears Merritt, Groton, MA (US)

(73) Assignee: Massachusetts Mutual Life Insurance Company, Springfield, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/673,491

(22) Filed: Nov. 4, 2019

Related U.S. Application Data

(63) Continuation of application No. 15/840,957, filed on Dec. 13, 2017, now Pat. No. 10,467,632.

(60) Provisional application No. 62/433,666, filed on Dec. 13, 2016.

(51) Int. Cl.
*G06F 21/00* (2013.01)
*G06Q 30/00* (2012.01)

(52) U.S. Cl.
CPC .................. *G06Q 30/0185* (2013.01)

(58) Field of Classification Search
None
See application file for complete search history.

(56) References Cited

U.S. PATENT DOCUMENTS

| 7,779,119 | B2* | 8/2010 | Ginter | H04L 63/0263 |
| | | | | 709/224 |
| 7,900,259 | B2* | 3/2011 | Jeschke | H04L 63/1433 |
| | | | | 726/25 |
| 8,739,278 | B2 | 5/2014 | Varghese | |
| 9,646,199 | B2 | 5/2017 | Bose et al. | |
| 10,628,827 | B1* | 4/2020 | Gailloux | G06Q 20/327 |
| 2002/0099578 | A1* | 7/2002 | Eicher, Jr. | G06Q 10/06 |
| | | | | 705/7.39 |
| 2005/0278786 | A1 | 12/2005 | Tippett et al. | |
| 2006/0288413 | A1* | 12/2006 | Kubota | H04L 63/1458 |
| | | | | 726/23 |
| 2014/0130170 | A1* | 5/2014 | Kuo | G06F 21/577 |
| | | | | 726/25 |
| 2014/0283085 | A1 | 9/2014 | Maestas | |
| 2015/0339477 | A1* | 11/2015 | Abrams | G06F 21/316 |
| | | | | 726/23 |

(Continued)

*Primary Examiner* — Maung T Lwin
(74) *Attorney, Agent, or Firm* — Foley & Lardner LLP (57) ABSTRACT

Embodiments of systems and methods for fraud review are disclosed. The systems may include multi-tiered computing systems which may receive fraud alerts from multiple sources. A computing system in a tier may receive a fraud alert and use one or more fraud risk metrics to determine whether the fraud alert should be escalated. If the computing system determines that the fraud alert should be escalated, the computing system may transmit an escalation message to a higher tier computing system. If the computing system determines that the fraud alert should not be escalated, the computing system may transmit a message to a fraud prevention computing system. In some embodiments, the computing system may determine that the fraud alert is a false positive and transmit a false positive message to the source of the fraud alert such as a lower tier computing system.

20 Claims, 2 Drawing Sheets

(56) References Cited

U.S. PATENT DOCUMENTS

2016/0343100 A1* 11/2016 Davenport ......... G06Q 30/0185
2016/0350738 A1   12/2016 Crooks
2018/0026944 A1*  1/2018 Phillips ............... H04L 63/1433
                                                          726/4

* cited by examiner

SYSTEMS AND METHODS FOR A MULTI-TIERED FRAUD ALERT REVIEW

CROSS-REFERENCE TO RELATED APPLICATIONS

This application is a continuation application of U.S. patent application Ser. No. 15/840,957, filed Dec. 13, 2017, which claims priority to U.S. Provisional Patent Application Ser. No. 62/433,666, filed on Dec. 13, 2016, which is hereby incorporated by reference in its entirety.

TECHNICAL FIELD

This application relates generally to computer systems and computer implemented methods for automatically reviewing and vetting fraud alerts in computer implemented transactions.

BACKGROUND

Fraudulent activities have been a huge problem in computer implemented transactions. For instance, a third party may steal authentication credentials of a legitimate client and make an unauthorized gain. A customer may also misrepresent one or more facts when providing information, e.g. by filling out online forms, to get an unfair advantage. Furthermore, employees of an organization may collude with customers or third parties for illegitimate gains. Computer systems implemented to make monetary transactions efficient and fast nevertheless allow fraudulent activities to be efficient and fast as well.

Conventional fraud prevention systems rely excessively on human intervention. For example, one or more computers may flag a potentially fraudulent activity in a monetary transaction and may prompt personnel from a fraud prevention department to review the flagged activity. The personnel involved may have to undertake actions such as calling the customer to confirm if he/she intended the transaction and/or calling law enforcement to report a potential fraudulent activity. Having people dealing with potential frauds in a case by case basis is highly inefficient, subjective, and expensive. For example, it is a cumbersome process when a person is reviewing a potential fraud—the person has to manually review various disparate information pieces and communicate with the customer and/or other entities to make a final determination. Furthermore, the evaluation may be subjective based on the competence and diligence of the person reviewing the fraud. For example, the reviewing person may fail to analyze a crucial piece of data. Also, in this era of global transactions, a fraud prevention center has to be manned 24 hours a day and seven days a week with a large amount of staff, which may be very expensive to an organization hosting or facilitating computer implemented transactions.

SUMMARY

What is therefore needed is an automated and intelligent fraud reviewing, vetting, and prevention system with minimal human intervention. What is also needed is a hierarchically configured computing systems that may receive fraud alerts and/or flags from diverse sources and automatically determine whether to escalate the fraud alerts and/or flags to varying degree of automatic investigative processes. What is further needed is a centralized computer system that may receive data and flags from diverse set of sources to automatically generate a comprehensive database to help fraud prevention.

In an embodiment, computer-implemented method comprises receiving, by a first level computing system, a first level fraud alert notification message from a webserver; retrieving, by the first level computing system, one or more data records associated with the first level fraud alert notification message and one or more data records of first level fraud risk metrics from a first level risk database; determining, by the first level computing system, a first level fraud risk score based upon the one or more data records associated with the first level fraud alert notification message and the one or more data records of the first level fraud metrics; upon determining by the first level computing system that the first level fraud risk score exceeds a first level fraud threshold: generating, by the first level computing system, a second level fraud alert notification message, wherein the second level fraud alert notification message includes one or more data fields indicating an escalation of the first level fraud alert notification message; transmitting, by the first level computing system, the second level fraud alert notification message to a second level computing system, wherein the second level computing system is at a higher tier than the first level computing system; transmitting, by the first level computing system, a stop execution message to the webserver, wherein the stop execution message instructs the webserver to stop executing computer operations associated with the first level fraud alert notification message; and upon determining by the first level computing system that the first level fraud risk score is below the first level fraud threshold: transmitting, by the first level computing system, a continue execution message to the webserver, wherein the continue execution message instructs the webserver to continue executing computer operations associated with the first level fraud alert notification message.

In another embodiment, a system comprises a first level risk database; a first level computing system configured to: receive a first level fraud alert notification message from a webserver; retrieve one or more data records associated with the first level fraud alert notification message and one or more data records of first level fraud risk metrics from the first level risk database; determine a first level fraud risk score based upon the one or more data records associated with the first level fraud alert notification message and the one or more data records of the first level fraud metrics; upon determining that the first level fraud risk score exceeds a first level fraud threshold: generate a second level fraud alert notification message, wherein the second level fraud alert notification message includes one or more data fields indicating an escalation of the first level fraud alert notification message; transmit the second level fraud alert notification message to a second level computing system, wherein the second level computing system is at a higher tier than the first level computing system; transmit a stop execution message to the webserver, wherein the stop execution message instructs the webserver to stop executing computer operations associated with the first level fraud alert notification message; and upon determining that the first level fraud risk score is below the first level fraud threshold: transmit a continue execution message to the webserver, wherein the continue execution message instructs the webserver to continue executing computer operations associated with the first level fraud alert notification message.

BRIEF DESCRIPTION OF THE DRAWINGS

The accompanying drawings constitute a part of this specification and illustrate embodiments of the subject matter disclosed herein.

DETAILED DESCRIPTION

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

A fraud may be any deliberate deception committed against or by an electronic transaction hosting company, an agent of the company, or a consumer for the purpose of unjustified financial gain. Frauds may occur during the process of buying, using, and/or selling, one or more products or services. Some non-limiting examples of fraud may be: intentionally failing to disclose significant medical conditions or other material facts on an application, collecting disability benefits after returning to work, a representative who bills a client personally without delivering a good or service, health care providers who bill twice for the same service or for services not provided, a physician who assists a claimant by certifying an unfounded disability claim, and taking an unauthorized loan based on a deceptive application. Other frauds may involve a third party stealing a customer's credentials to receive goods and services intended for the customer.

Embodiments herein provide an automated and hierarchical fraud detecting and reviewing systems and methods. The embodiments implement multi-tiered computing systems which may receive fraud alerts from multiple and diverse sources and may determine if a received fraud alert has to be escalated for a more complex analysis. The multiple and diverse sources may include call-center computers, computer systems associated with the service ambassadors, quality assurance servers, document management servers, claims servers, and/or treasury servers. Furthermore, each of the tiered computing system may be associated with a respective database or a shared database that allows the computing system to make the escalation determination.

An exemplary system may include computing systems arranged in hierarchical tiers. For example, the computing systems may be arranged into three tiers: a low risk tier, a medium risk tier, and the high risk tier. The low risk tier computing systems may receive low risk fraud alerts from one or more fraud alert sources. The low risk fraud alerts may include one or more suspicious activities which may not amount to a red flag for a potential fraud. The medium risk computing systems may receive flagged fraud alerts from one or more fraud alert sources. The flagged fraud alerts may be generated by the fraud alert sources based on known fraud red flags. The high risk computing systems may receive notifications of fraud from one or more fraud alert sources. The notifications of fraud may be generated by the one or more fraud alert sources based upon determining that that there is a high likelihood of fraudulent activities.

Each of the tiered computing systems may be associated with its own database or a shared database that allows the respective computing system whether or not to escalate the alerts/notifications received from the one or more sources. Each of the databases, shared or otherwise, may contain data records of electronic activity of a plurality of customers and agents, and the respective computing system may query the respective database to retrieve data records related to the received fraud alerts/notifications. Each of databases may further comprise data records of one or more metrics that the respective computing system may use to calculate a fraud score. Based on the calculated fraud score, the respective computing system may determine if an escalation message has to be generated and sent to a higher tiered computing system. For instance, if the fraud score is above a threshold, then the respective computing system may generate the escalation message. If however, the fraud score is below the threshold, the respective computing system may generate false positive message and transmit the false positive message to the source of the fraud alert/notification.

For example, the low risk computing system may receive a notification that a customer requested an address change. The low risk computing system may query the associated database to retrieve data records related to the customer and relevant to the received notification. Furthermore, the low risk computing system may query the associated database to retrieve one or more fraud risk metrics. Applying the one or more fraud risk metrics to the retrieved data records, the lowest risk computing system may calculate a low risk fraud score. Based on the calculated low risk fraud score, the lowest risk computing system may generate an escalation message for the medium risk computing system. For instance, if the customer indicated he/she was renting, change of address may pose a lower risk versus if the customer indicated he/she owned the property at the address.

The medium risk computing system may receive alerts from one or more fraud sources and/or escalation message from the lowest risk computing system. The medium risk computing system may query the associated database to retrieve data records associated with the alert and/or the escalation message. Furthermore, the medium risk computing system may query the associated database to retrieve one or more fraud risk metrics. Applying the one or more fraud risk metrics the retrieved data records, the medium risk computing system may calculate a medium risk fraud score. If the medium risk fraud score is above a threshold, the medium risk computing system may generate a high-risk escalation message to be sent to the high risk computing system. If the medium risk fraud score is below the threshold, the medium risk computing system may generate a false positive message to be sent back to the low risk computer system. Continuing with the above example, if the customer changing the address was above the age of 60 years old, and not being a digital native, did not often use online tools, but rather made calls or wrote letters for any change of information—and the request for the change of address came online, then the medium risk computing system may generate a high-risk escalation message. However, if the customer changing the address was a graduate student and the database records indicated that he/she graduated recently, then the medium risk computing system may generate a false positive message and may transmit the same to the low-risk computing system.

The high risk computing system may receive a high risk fraud alerts from one or more fraud alert sources and high-risk escalation messages from the medium risk computing system. The high risk computing system may query the associated database to retrieve data records associated with the high risk alerts and/or the high-risk escalation messages. Furthermore, the high risk computing system may query the associated database to retrieve one or more fraud risk metrics. Applying the one or more fraud risk metrics the retrieved data records, the high risk computing system may calculate a high risk fraud score. If the high risk fraud score is above a threshold, the high-risk computing system may generate a fraud case file. Furthermore, the high-risk computer system may notify appropriate law enforcement authorities about a possible fraud.

The databases associated with each of the low risk, medium risk, and high risk computing systems may be updated based on the activities of the computing systems. For example, the database associated with the low risk computing system may be populated with false positives such that the low risk computing system may resolve similar fraud alerts without notifying the medium risk computing system. Each of the databases may also be updated periodically based upon the experts' assessment and analysis. In other words, all of the computing systems may generate a virtuous cycle of continuous learning to automatically flag and assess potential frauds.

Figure 1:
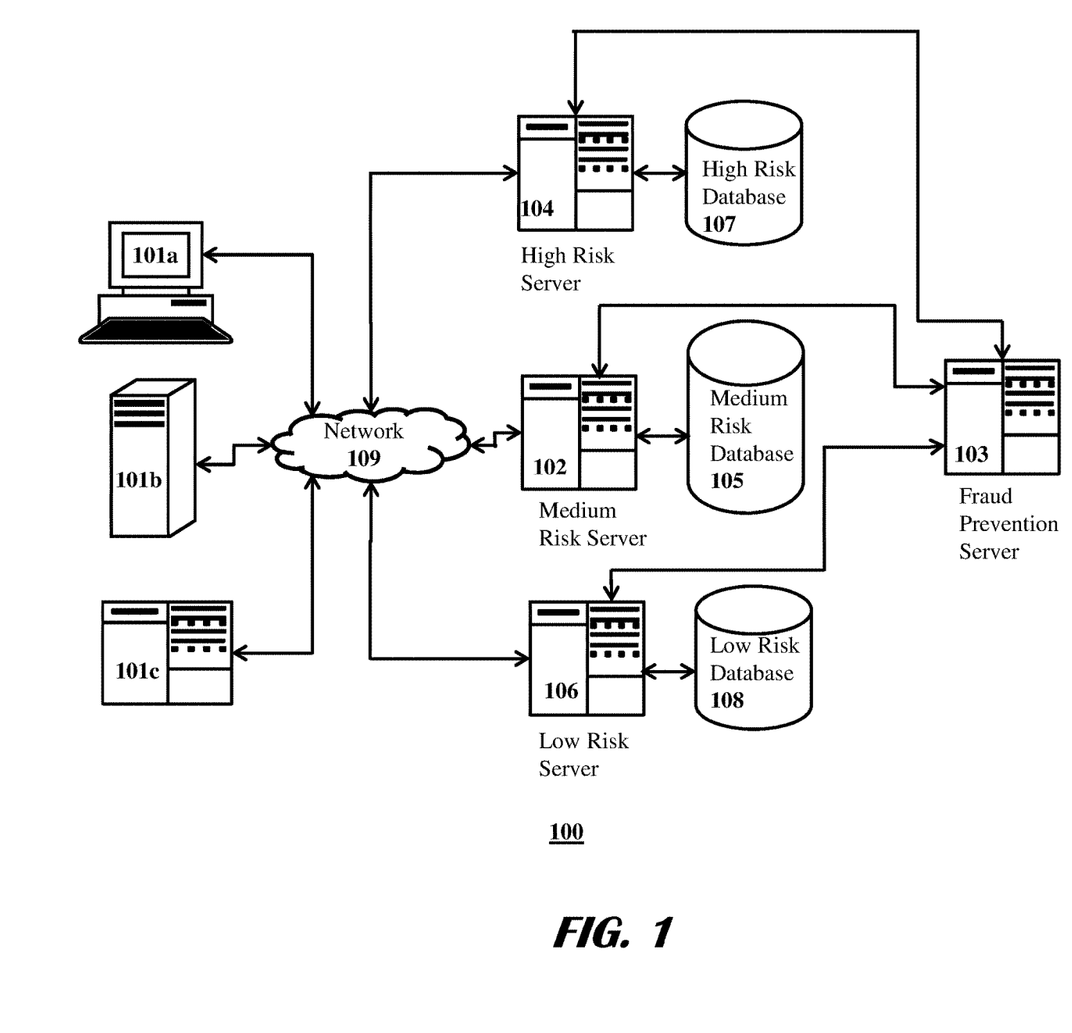
FIG. 1 shows an exemplary system, according to an exemplary embodiment.

FIG. 1 shows an exemplary system 100 for automatic fraud alert review, according to an exemplary embodiment. The system 100 may include fraud alert sources 101, a low risk server 106, a low risk database 108, a medium risk server 102, a medium risk database 105, a high risk server 104, a high risk database 107, a network 109, and a fraud prevention server 103. One or more networks 109 may connect one or more components of the system 100. Examples of the networks 109 include, but are not limited to, Local Area Network (LAN), Wireless Local Area Network (WLAN), Metropolitan Area Network (MAN), Wide Area Network (WAN), and the Internet. The communication over the networks 109 may be performed in accordance with various communication protocols, such as Transmission Control Protocol and Internet Protocol (TCP/IP), User Datagram Protocol (UDP), and IEEE communication protocols.

The fraud alert sources 101 may comprise various computer systems that may generate and transmit fraud alerts messages to one or more of the low risk server 106, the medium risk server 102, and the high risk server 104. Non-limiting examples of the fraud alert sources 101 include call-center computers, computer systems associated with the service ambassadors, quality assurance servers, document management servers, claims servers, and treasury servers. In other words, the fraud alert sources 101 may be diverse types of computer systems and servers gathering diverse types of data. Each fraud alert source 101 may gather data records based on its own functionality. For example, a call center computer 101a may gather data records of each incoming calls under the data fields of: the time the call was received, duration of the call, requests made by the caller, issues raised by the caller, actions taken by an agent taking the call during the call, actions taken by the agent after taking the call, and/or any other data field. As another example, a claims server 101b may gather data records under the fields such as the amount of a claim, the qualifying event for the claim, the duration of the policy before the claims was made, and prior claims records of the customer making the claim. Each of the fraud alert servers 101 may aggregate data and store the data on one or more associated databases.

Each of the fraud alert sources 101 may implement one or more processes to generate a fraud alert. Continuing with the call-center computer 101a example, a processor in the call center computer 101a may query the aggregated database records for particular words, word combinations and/or phrases. The example word combinations that the processor may query for may include: "payor" and "change", "beneficiary" and "change", "owner" and "change", "address" and "change", and "loan" and "process". Example words that the process may query for may include: "withdraw", "disbursement", and "alert". Based on the query, the processor in the call-center computer may generate a fraud alert. The fraud alert may include customer information, insurance policy information, and/or other information associated with a potential fraud situation. The fraud alert sources 101 may also generate suspicious activity notifications based upon determining a low risk of fraud. In addition, the fraud alert sources 101 may generate a message of a probable fraud based upon determining a high risk of fraud.

The low risk server 106 may receive one or more suspicious activity notifications from the one or more fraud alert sources 101. The low risk server 106 may comprise one or more processors that process instructions stored in one or more non-transitory storage media or received from other servers/computers. The low risk server 106 may include or may be associated with a low risk database 108. In operation, the low risk server 106 may query the low risk database 108 to retrieve one or more data records associated with the suspicious activity notification. For example, if the suspicious activity notification is more than two purchases by a customer within a day, the low risk 106 may retrieve one or more data records containing the customer's purchase activity for the past two years, for example. Furthermore, the low risk server 106 may query the low risk database 108 to retrieve one or more data records of low fraud risk metrics. The low risk server 106 may determine a low fraud risk score based on the one or more data records associated with the suspicious activity and the one or more data records of low fraud risk metrics. If the low risk server 106 determines that the low fraud risk score is above a low fraud risk threshold, the low risk server 106 may generate an escalation message and transmit the escalation message to the medium risk server 102. If the low risk server 106 determines that the low fraud score is below the low fraud risk threshold, the low fraud risk server 106 may generate false positive message and transmit the false positive message to the source of the suspicious activity notification.

The medium risk server 102 may receive fraud alert messages from fraud alert sources 101 or escalation messages from the low risk server 106. The fraud alert messages may be based upon known one or more known fraud flags. The medium risk server 102 may comprise one or more processors configured to process instructions stored in one or more non-transitory storage media or received from other servers/computers. The medium risk server 102 may include or may be associated with a medium risk database 105. In operation, the medium risk server 102 may query the medium risk database 105 to retrieve one or more data records associated with the fraud alert messages or the escalation messages. For example, if an escalation message is about more than two purchases by a customer within a day and that the customer has not shown such behavior in the past two years, the medium risk server 102 may retrieve one or more data records containing the customer's purchase activity for the past five years, for example. Furthermore, the medium risk server 102 may query the medium risk database 105 to retrieve one or more data records of medium fraud risk metrics. The medium risk server 102 may determine a medium fraud risk score based on the one or more data records associated with the escalation message and the one or more data records of medium fraud risk metrics. If the medium risk server 102 determines that the medium fraud risk score is above a medium fraud risk threshold, the medium risk server 102 may generate an escalation message and transmit the escalation message to the high risk server 104. If the medium risk server 102 determines that the medium fraud score is below the medium fraud risk threshold, the medium fraud risk server 102 may generate false positive message and transmit the false positive message to the low risk server 106.

The high risk server 104 may receive messages of probable fraud from the fraud alert sources 101 or escalation messages from the medium risk server 102. The fraud alert sources 101 may generate the messages of probable fraud based upon determining that there is a high likelihood of fraud. The high risk server 104 may comprise one or more processors configured to process instructions stored in one or more non-transitory storage media or received from other servers/computers. The high risk server 104 may include or may be associated with a high risk database 107. In operation, the high risk server 104 may query the high risk database 107 to retrieve one or more data records associated with the messages of probable fraud or the escalation messages. For example, if an escalation message is about more than two purchases by a customer within a day and that the customer has not shown such behavior in the past five years, the high risk server 104 may retrieve one or more data records containing purchase activity for the past five years of other customers living in the same geographical area as the customer, for example. Furthermore, the high risk server 104 may query the high risk database 107 to retrieve one or more data records of high fraud risk metrics. The high risk server 104 may determine a high fraud risk score based upon the one or more data records associated with the escalation message and the one or more data records of high fraud risk metrics. If the high risk server 104 determines that the high fraud risk score is above a high fraud risk threshold, the high risk server 104 may generate a notification of high fraud risk to the fraud prevention server 103. In addition or in the alternative, the high risk server 104 may also transmit a message indicating a probability of a fraud to law enforcement via one or more communication channels, for example, e-mail. If the high risk server 104 determines that the high fraud score is below the high fraud risk threshold, the high fraud risk server 104 may generate false positive message and transmit the false positive message to the medium risk server 102.

The fraud prevention server 103 may receive one or more messages from one or more of the high risk server 104, the medium risk server 102, and the low risk server 106. For example, the fraud prevention server 103 may receive a message of high fraud risk from the high risk server 104. The fraud prevention server 104 may notify the system administrator of the receipt of the message of high fraud risk. The fraud prevention server may co-ordinate one or more functions of one or more of the high risk server 104, the medium risk server 102, and the low risk server 106. For example, the fraud prevention server 103 may provide periodic updates to the one or more of the high risk database 107, the medium risk database 105, and the low risk database 108. Furthermore, the fraud prevention server may provide an interface for a system administrator to provide update the one or more databases 107, 105, 108. The servers 104, 102, 106 may receive the updates, for example, updates to the fraud risk metrics, and update the respective databases 107, 105, 108 accordingly.

Figure 2:
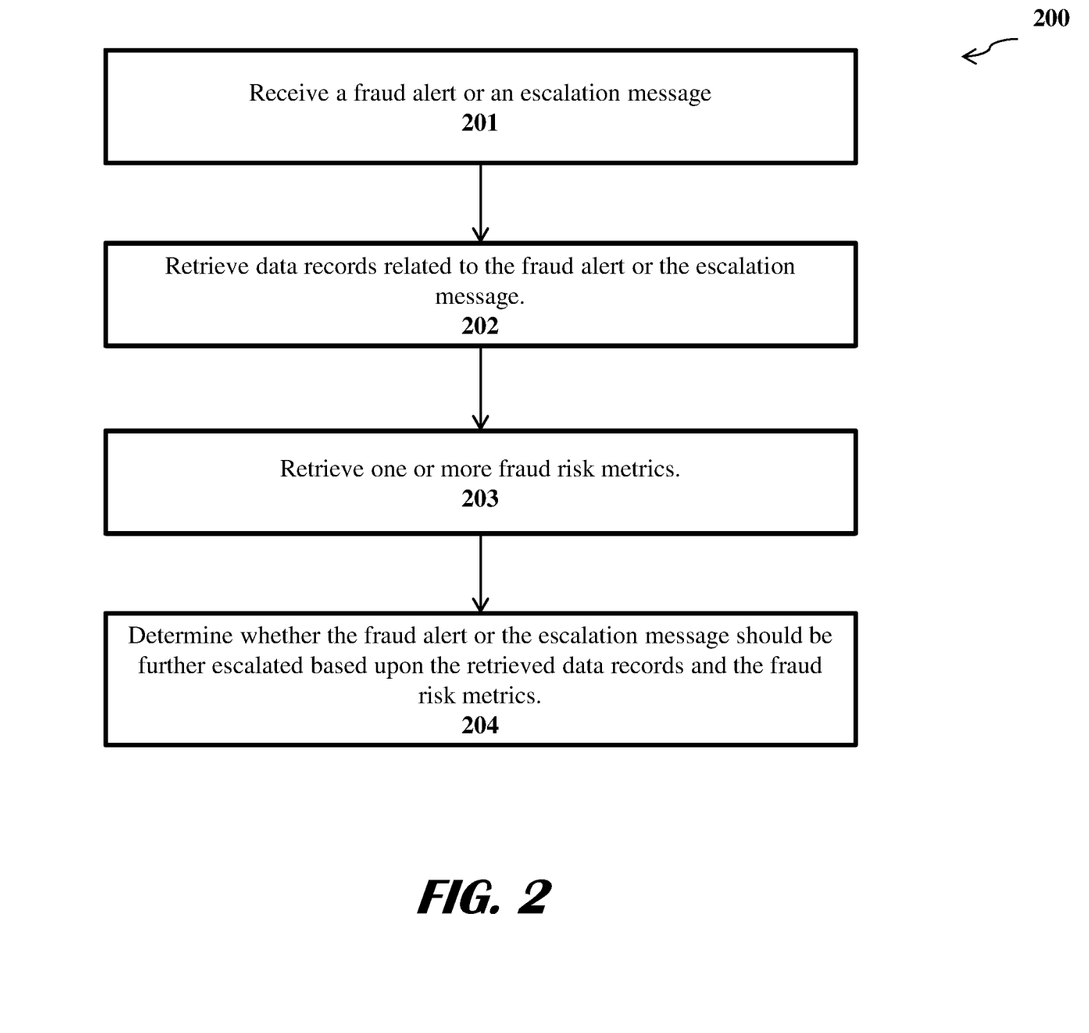
FIG. 2 shows an exemplary method, according to an exemplary embodiment.

FIG. 2 shows an exemplary method 200 of automatic fraud alert review, according to an exemplary embodiment. The method may be implemented by a plurality of hierarchically arranged multiple computing systems. However for the sake of brevity, the following describes the steps of the method 200 as being implemented by a single computing system.

In a first step 201, the computing system may receive a fraud alert or an escalation message (also referred to as a fraud alert notification message). The fraud alert may be sent from one or more fraud alert sources, which may be diverse type of computer systems such as call-center computers, computer systems associated with the service ambassadors, quality assurance servers, document management servers, claims servers, and treasury servers. These computers systems may generate the fraud alerts based on known fraud red flags such as excessive cash withdrawal, multiple purchases, and/or frequent changes of customer address. For example, a webserver may generate a fraud alert that a customer has tried to enter an invalid password a number of times above a predetermined threshold number. The escalation message may be from a lower tier computing system. The lower tier computing system may receive a fraud alert with a lower risk than the fraud alert received by the currently referenced computing system and may determine based on data records related to the lower risk fraud alert and one or more lower risk fraud metrics that the fraud alert should be escalated and generate the escalation message.

In a next step 202, the computing system may retrieve data records related to the fraud alert or the escalation message. The computing system may query an associated database for the data records related to the fraud alert or the escalation message. For example, if the fraud alert or the escalation message pertains to a customer, the computing system may query the data records of the customer and/or data records of similarly situated customer such as customers in the similar age group and similar income level. The data records of similarly situated customers may be used for cross validation.

In a next step 203, the computing system may retrieve one or more fraud risk metrics. The fraud risk metrics may be stored in one or more databases associated with the computing systems. In some embodiments, the fraud risks metrics may include one or more data records that include information weigh different factors to make a composite determination. In other embodiments, the fraud risk metrics may include data records containing information on likelihood of a fraud based on the presence of one or more factors.

In a next step 204, the computing system may determine whether the fraud alert or the escalation message should be further escalated based upon the retrieved data records and the fraud risk metrics. The computing system may apply the fraud risk metrics on the retrieved data records. In some embodiments, the computing system may determine a numeric value of a probability of fraud for the fraud alert or the escalation message. If the numeric value of the probability of fraud is above a threshold, the computing system may further escalate fraud alert or the received escalation message to generate a further escalation message. The further escalation message may contain one or more data fields indicating that the received escalation has been further escalated. The computing system may transmit the further escalation message to a second computing system which is of higher tier than the computing system. Furthermore, the computing system may transmit a stop execution message to the source (such as a webserver) of the fraud alert. The stop execution message may instruct the webserver to stop executing computer operations associated with the fraud alert. If the numeric value of the probability of fraud is below the threshold, the computing system may transmit a false positive message to the source of the fraud alert or the escalation message. In this scenario, the computing system may transmit a continue execution message to the source (such as a webserver) of the fraud alert. The continue execution message may instruct the webserver to continue executing computer operations associated with the fraud alert.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
    receiving, by a first level computing system, a first level fraud alert notification message from a webserver;
    retrieving, by the first level computing system, one or more data records associated with the first level fraud alert notification message and one or more data records of first level fraud risk metrics from a first level risk database;
    determining, by the first level computing system, a first level fraud risk score based upon the one or more data records associated with the first level fraud alert notification message and the one or more data records of the first level fraud risk metrics;

upon determining by the first level computing system that the first level fraud risk score exceeds a first level fraud threshold:
  generating, by the first level computing system, a second level fraud alert notification message, wherein the second level fraud alert notification message comprises one or more data fields indicating an escalation of the first level fraud alert notification message; and
  transmitting, by the first level computing system, the second level fraud alert notification message to a second level computing system, wherein the second level computing system is at a higher tier than the first level computing system.

2. The computer-implemented method of claim 1, further comprising:
  upon determining by the first level computing system that the first level fraud risk score is below the first level fraud threshold, transmitting, by the first level computing system, a continue execution message to the webserver, wherein the continue execution message instructs the webserver to continue executing computer operations associated with the first level fraud alert notification message.

3. The computer-implemented method of claim 2, further comprising:
  receiving, by the second level computing system, the second level fraud alert notification message;
  retrieving, by the second level computing system, data records associated with the second level fraud alert notification message and one or more data records of second level fraud risk metrics;
  determining, by the second level computing system, a second level fraud risk score based upon the one or more data records associated with the second level fraud alert notification message and the one or more data records of the second level fraud risk metrics;
  generating, by the second level computing system, a fourth level fraud alert notification message in response to determining that the second level fraud risk score exceeds a second level fraud threshold; and
  transmitting, by the second level computing system, the fourth level fraud alert notification message to a fourth level computing system.

4. The computer-implemented method of claim 3, wherein the fourth level computing system is at a higher tier than the second level computing system.

5. The computer-implemented method of claim 3, further comprising:
  generating, by the second level computing system, a second level false positive notification message in response to determining that the second level fraud risk score is below the second level fraud threshold; and
  transmitting, by the second level computing system, the second level false positive notification message to the first level computing system.

6. The computer-implemented method of claim 3, further comprising:
  transmitting, by the second level computing system, a notification message to one or more law enforcement computer systems in response to determining that the second level fraud risk score is above the second level fraud threshold.

7. The computer-implemented method of claim 3, wherein the first level, second level, third level, and fourth level computing systems are associated with a common database.

8. The computer-implemented method of claim 3, further comprising:
  receiving, by the second level computing system, one or more manual updates to the second level fraud risk metrics; and
  updating, by the second level computing system, the second level fraud risk metrics based upon the one or more manual updates.

9. The computer-implemented method of claim 1, further comprising:
  receiving, by the first level computing system, one or more manual updates to the first level fraud risk metrics; and
  updating, by the first level computing system, the first level fraud risk metrics based upon the one or more manual updates.

10. The computer-implemented method of claim 1, further comprising:
  receiving, by the first level computing system, one or more automated updates to the first level fraud risk metrics from a fraud prevention server; and
  updating, by the first level computing system, the first level fraud risk metrics based upon the one or more automated updates.

11. A computer system comprising:
  a first level computing system, comprising a first memory and a first processor executing first instructions stored in the first memory, in communication with a second level computing system, comprising a second memory and a second processor executing second instructions stored in the second memory, wherein the first level computing system is configured to:
    receive a first level fraud alert notification message from a webserver;
    retrieve one or more data records associated with the first level fraud alert notification message and one or more data records of first level fraud risk metrics from a first level risk database;
    determine a first level fraud risk score based upon the one or more data records associated with the first level fraud alert notification message and the one or more data records of the first level fraud risk metrics;
    upon determining by the first level computing system that the first level fraud risk score exceeds a first level fraud threshold:
      generate a second level fraud alert notification message, wherein the second level fraud alert notification message comprises one or more data fields indicating an escalation of the first level fraud alert notification message; and
      transmit the second level fraud alert notification message to the second level computing system, wherein the second level computing system is at a higher tier than the first level computing system.

12. The computer system of claim 11, wherein the first level computing system is configured to:
  upon determining by the first level computing system that the first level fraud risk score is below the first level fraud threshold, transmit a continue execution message to the webserver, wherein the continue execution message instructs the webserver to continue executing computer operations associated with the first level fraud alert notification message.

13. The computer system of claim 12, wherein the second level computing system is configured to:
  receive the second level fraud alert notification message;

retrieve data records associated with the second level fraud alert notification message and one or more data records of second level fraud risk metrics;

determine a second level fraud risk score based upon the one or more data records associated with the second level fraud alert notification message and the one or more data records of the second level fraud risk metrics;

generate a fourth level fraud alert notification message in response to determining that the second level fraud risk score exceeds a second level fraud threshold; and transmit the fourth level fraud alert notification message to a fourth level computing system.

14. The computer system of claim 13, wherein the fourth level computing system is at a higher tier than the second level computing system.

15. The computer system of claim 13, wherein the second level computing system is further configured to:

generate a second level false positive notification message in response to determining that the second level fraud risk score is below the second level fraud threshold; and transmit the second level false positive notification message to the first level computing system.

16. The computer system of claim 13, wherein the second level computing system is further configured to:

transmit a notification message to one or more law enforcement computer systems in response to determining that the second level fraud risk score is above the second level fraud threshold.

17. The computer system of claim 13, wherein the first level, second level, third level, and fourth level computing systems are associated with a common database.

18. The computer system of claim 13, wherein the second level computing system is further configured to:

receive one or more manual updates to the second level fraud risk metrics; and update the second level fraud risk metrics based upon the one or more manual updates.

19. The computer system of claim 11, wherein the first level computing system is further configured to:

receive one or more manual updates to the first level fraud risk metrics; and update the first level fraud risk metrics based upon the one or more manual updates.

20. The computer system of claim 11, wherein the first level computing system is configured to:

receive one or more automated updates to the first level fraud risk metrics from a fraud prevention server; and update the first level fraud risk metrics based upon the one or more automated updates.

* * * * *